US011578961B1

(12) United States Patent
McNeely, IV et al.

(10) Patent No.: US 11,578,961 B1
(45) Date of Patent: Feb. 14, 2023

(54) APPARATUS FOR DETECTING IRREGULARITIES IN AIRFIELD MARKINGS

(71) Applicant: HI-LITE AIRFIELD SERVICES, LLC, Adams Center, TX (US)

(72) Inventors: Richard C. McNeely, IV, Pulaski, NY (US); John S. McNeely, Adams Center, NY (US)

( * ) Notice: Subject to any disclaimer, the term of this patent is extended or adjusted under 35 U.S.C. 154(b) by 732 days.

(21) Appl. No.: 16/570,566

(22) Filed: Sep. 13, 2019

Related U.S. Application Data

(60) Provisional application No. 62/730,884, filed on Sep. 13, 2018.

(51) Int. Cl.
*G01B 3/10* (2020.01)
*G01B 1/00* (2006.01)

(52) U.S. Cl.
CPC ...... *G01B 3/10* (2013.01); *G01B 1/00* (2013.01)

(58) Field of Classification Search
CPC .................................. G01B 3/10; G01B 1/00
See application file for complete search history.

(56) References Cited

U.S. PATENT DOCUMENTS

| | | | | |
|---|---|---|---|---|
| 2,653,387 A * | 9/1953 | Cameron | ............... | B25H 7/005 33/430 |
| 2,713,205 A * | 7/1955 | Nielsen | ................. | B43L 13/205 33/479 |
| 2,722,055 A * | 11/1955 | Rader | ....................... | B43L 7/00 33/483 |
| 2,903,795 A * | 9/1959 | Wilfert | .................... | A41H 3/002 33/494 |
| 3,142,906 A * | 8/1964 | Mitsos | .................. | B43L 13/201 33/563 |
| 3,241,242 A * | 3/1966 | Dempsey | .............. | B43L 13/206 33/565 |
| 3,412,470 A * | 11/1968 | Williams | ............... | G09B 19/02 434/188 |
| 4,641,436 A * | 2/1987 | Tzen | ......................... | B43L 7/00 33/483 |
| 6,266,889 B1 * | 7/2001 | Boyce | ................. | E04G 21/1891 33/484 |
| 7,743,521 B2 * | 6/2010 | O'Morrow, Sr. | ....... | B43L 7/027 33/417 |
| 9,121,688 B1 * | 9/2015 | Schmid | .................... | B25H 7/02 |
| 2008/0155849 A1 * | 7/2008 | Bagley | .................. | D05B 97/12 33/566 |
| 2012/0234150 A1 * | 9/2012 | Holtgreive | ............ | B26F 1/3853 83/613 |
| 2013/0036618 A1 * | 2/2013 | Wall | ......................... | G01B 3/38 33/494 |
| 2014/0304997 A1 * | 10/2014 | Hu | ............................ | G01B 3/04 33/488 |

\* cited by examiner

*Primary Examiner* — Yaritza Guadalupe-McCall
(74) *Attorney, Agent, or Firm* — Jackson Walker LLP

(57) ABSTRACT

A gauge for verifying that an airfield's runway and taxiway markings are a specific size. It is a complete reference tool for assessing markings manually by a technician; that is a tool to help reduce the subjectivity of the assessment by the technician. The gauge is flexible and can be rolled or folded for transport. In order to make the gauge easier to use, the measurements are made using very specifically placed and sized slots that conform to ideal airfield markings. Graduation markings at the end of the slots help the technician determine the size of marking discrepancies.

12 Claims, 12 Drawing Sheets

US 11,578,961 B1

APPARATUS FOR DETECTING IRREGULARITIES IN AIRFIELD MARKINGS

This application is based upon and claims priority from U.S. Provisional application Ser. No. 62/730,884, which is incorporated herein by reference.

BACKGROUND OF THE INVENTION

Field of the Invention

An apparatus for detecting irregularities in runway markings at an airfield. The measurement gauge is operable to provide a compliance indication revealing a irregularity of the size of a marking surface region of an airfield marking, wherein the irregularity is moves the marking out of compliance of federal regulations.

Background Information

The Federal Aviation Administration ("FAA") recommends the guidelines and standards for the marking of airport runways, taxiways, and aprons. The use of these standards is the only method of compliance with the marking of runways, taxiways, and aprons for airports certificated under Title 14 Code of Federal Regulations Part 139, Certification of Airports (Part 139). The FAA's standards are required to be used on all new airport projects, as well as being implemented at all existing Part 139 certificated airports. The FAA standards are also mandatory for all projects funded with federal grant monies through the Airport Improvement Program (AIP) and/or with revenue from the Passenger Facility Charge (PFC) Program. Thus, an airport administration's compliance with the FAA standards for airport markings is extremely important.

The FAA requires that airport runway markings meet, among other standards, certain length, width, and placement measurements. Because of the extreme use that airport markings are subjected to, airport administrations must recoat/repaint the markings to keep them in compliance with the FAA's standards.

Airport runway marking lines are held to very exacting measurement standards, specific color and reflectivity requirements are also items that need to be measured for compliance. Because of the extreme use that airport markings are subjected to, airport administrations are constantly needing to check and confirm that the markings meet the standards. Specific color and reflectivity requirements are also items that need to be measured for compliance. However, detecting irregularities in the markings so can be very time intensive, particularly given the relatively minute variations from specs that are difficult to detect and can result from use and multiple recoatings/repaintings.

Relatively minute variations from specs are difficult to detect. Closing runways in order to recoat/repaint the markings, even though temporary, results in lost use of the subject runway and increased use of other runways (which in turn further damages their markings) and potential lost revenue from the closing of the runway.

Condition monitoring of markings is of great importance. A problem that airport administrations face is that different portions of the airport markings are subjected to different levels of use. Markings at one part of the runway may be subjected to much more traffic and thus be damaged at a higher level than the markings at another part of the runway. Likewise, repainting can occur in some areas more frequently than other areas. The cost to the airport due to irregularities or non-compliant markings or portions of the airport markings that are not in compliance with the FAA standards. Issues can occur, in part, due to the large number and extent of markings, which can lead to human error in determining marking compliance, because measurements must be repeated many times.

A marking as little as a half an inch out of compliance can become an issue if found by an FAA inspector. Inaccurate airfield markings can cost an airport thousands of dollars in marking removal, closures, safety concerns, and industry embarrassment during an FAA part 139 inspection.

SUMMARY OF THE INVENTION

Embodiments of an apparatus for detecting irregularities in markings and a method of using the apparatus are disclosed. It is designed to more quickly measure all airfield markings to ensure compliance with Federal Aviation Administration requirements.

The method of use of the present invention involves using the apparatus to identify airfield marking irregularities to improve visibility through unique airfield maintenance programs.

It is anticipated that measurements will be completed using trained personnel, or users, doing visual assessments.

DETAILED DESCRIPTION OF THE PREFERRED EMBODIMENT

Figure 1:
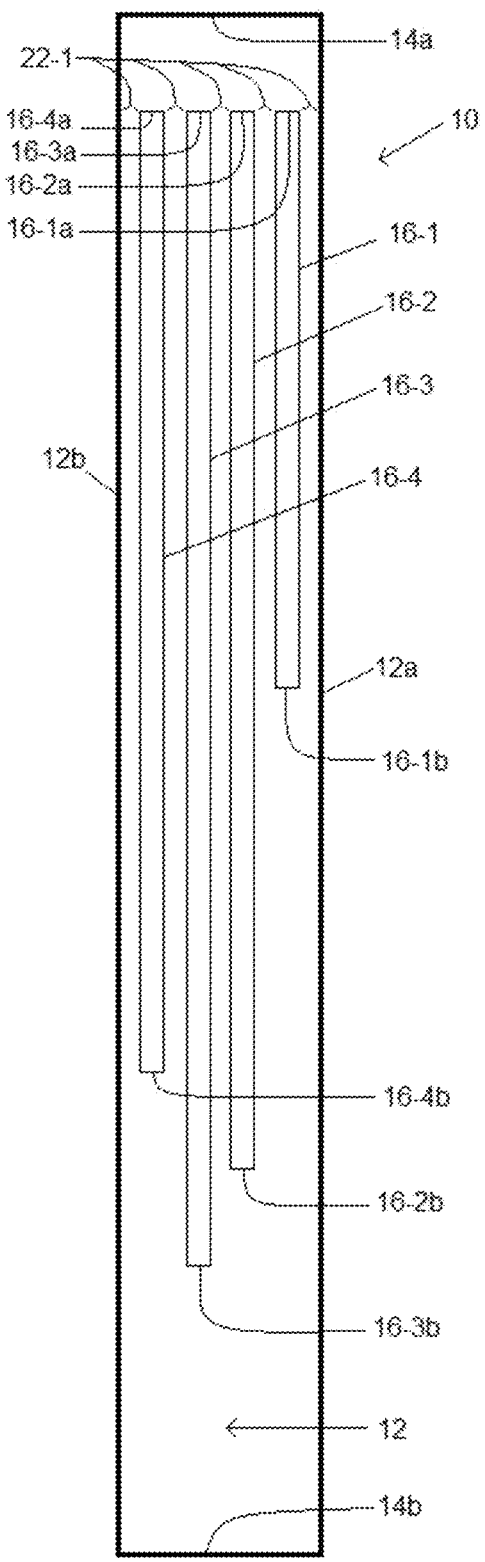
FIG. 1 is a top side view of a first embodiment of the airfield gauge.

| | |
|---|---|
| 10 | Gauge |
| 12 | Gauge Side |
| 12a | Gauge First Edge |
| 12b | Gauge Second Edge |
| 14a | Gauge First End |
| 14b | Gauge Second End |
| 16 | Slot |
| 16-1 | First Slot |
| 16-1a | First Slot First End |
| 16-1b | First Slot Second End |
| 16-2 | Second Slot |
| 16-2a | Second Slot First End |
| 16-2b | Second Slot Second End |
| 16-3 | Third Slot |
| 16-3a | Third Slot First End |
| 16-3b | Third Slot Second End |

DETAILED DESCRIPTION OF THE PREFERRED EMBODIMENT

| | |
|---|---|
| 16-4 | Fourth Slot |
| 16-4a | Fourth Slot First End |
| 16-4b | Fourth Slot Second End |
| 16-5 | Fifth Slot |
| 16-5a | Fifth Slot First End |
| 16-5b | Fifth Slot Second End |
| 16-6 | Sixth Slot |
| 16-6a | Sixth Slot First End |
| 16-6b | Sixth Slot Second End |
| 16-7 | Seventh Slot |
| 16-7a | Seventh Slot First End |
| 16-7b | Seventh Slot Second End |
| 18 | Scale |
| 20 | Slot Graduation |
| 20a | Slot Graduation First End |
| 20b | Slot Graduation Second End |
| 22 | Separation |
| 24 | Edge Slot |
| 24a | Edge Slot First End |
| 24b | Edge Slot Second End |
| 26a | First Orientation |
| 26b | Second Orientation |
| 100 | Runway Hold Position Marking (Hold Bar) |
| 102 | Threshold Bar |
| 104 | Threshold Markings |
| 104a | Threshold Marking Separation |
| 106 | Designation Marker |
| 108a | Touchdown Zone - Triples |
| 108b | Doubles |
| 108c | Singles |
| 110 | Aiming Point |
| 112 | Runway Centerline |
| 114 | Taxiway Edge Line |
| 116 | Runway Edge Line |
| 118 | Intermediate Hold Position |
| 120 | Enhanced Taxiway Centerline |
| 122 | ILS Critical Boundary |
| 124 | Hold Position Sign |
| 126 | Taxiway Centerline |

Unless otherwise specifically noted, articles depicted in the drawings are not necessarily drawn to scale.

Throughout this disclosure, a hyphenated form of a reference numeral refers to a specific instance of an element and the un-hyphenated form of the reference numeral refers to the element generically or collectively. Thus for example, widget 12-1 would refer to a specific widget of a widget class 12, while the class of widgets may be referred to collectively as widgets 12 and any one of which may be referred to generically as a widget 12.

Referring to the figures, throughout the following discussion, a hyphenated reference numeral refers to a particular instance of an element while an un-hyphenated form of the same reference numeral refers to the element generically or to a plurality of the elements collectively. For example, a first widget 99-1 represents a particular instance of a plurality of widgets 99, any one of which may be referred to generically as a widget 99.

FIG. 1. illustrates a first embodiment of a gauge 10. The gauge 10 is generally rectangular and bordered by first and second edges 12a & 12b, and first and second ends 14a & 14b. The planar, side 12, is defined by the first and second edges 12a & 12b, and first and second ends 14a & 14b. Slots 16 are cut through or marked in the gauge side 12. The gauge 10 has top and bottom planar sides 12.

The slots 16 are anticipated to be apertures through the gauge side 12. Alternatively, the slots 16 could also be transparent or semi-transparent with visible lines marking the boundaries (outlines of the slot 16) of the slot 16—if the gauge 10 is sufficiently transparent for users to compare the size of the airfield markings to the size of the slots 16. The gauge 10 can be laid out flat on the taxiway or runway of the airfield over the marking that the user desires to check and a slots 16, chosen for its size, is compared to the chosen marking. The slots 16, separations 22, edges 12, ends 14, edge slots 24, and various combinations thereof can be used to check various airfield markings. It is also anticipated that selected portions of the gauge 10 may be made, or cover with, magnifying material. The magnifying material provides magnification for a user looking through it, and could be made from lenses, such as shaped lenses, or Fresnel lenses. It is future anticipated that the lenses may be flexible. The advantage of having a portion of the gauge 10 providing magnification is that when the user looks through a semi-transparent gauge 10 or slot 16, the user is provided a more detailed view when assessing the marking.

It is anticipated that the gauge 10 may be made of a transparent or semi-transparent material. As used herein, "transparent" and "semi-transparent" mean that a user can see airfield markings through the gauge 10 when the gauge is laid on top of the markings. The term "semi-transparent" encompasses "transparent." The slots 16 can either be outlines (marked with pigment, grooves, or a raised outline) if the gauge 10 material is transparent or semi-transparent, or the slots 16 may be apertures if the gauge 10 material is transparent, semi-transparent, not semi-transparent, or opaque.

It is further anticipated that the gauge 10 material may be flexible such that it can conform to rises and falls in the airfield runways and taxiways. Additionally, if the gauge 10 material is flexible it can be rolled for storage or transport.

The slots 16 are separated by separations 22-1. The first separations 22-1 are three (3) inches wide. Or, the slots 16 are three (3) inches apart. The slots 16-1, 16-2, 16-3, and 16-4 (as measured along their first or second ends) are two (2) inches wide. Thus, in this first embodiment, the gauge 10 is twenty-three (23) inches wide (as measured along its first end 14a or second end 14b).

The first slot 16-1 is used to measure centerline 112, edgeline 116, chevrons, shoulder markings, arrow heads, and distance between centerline 112 and lead on/off line. The length of first slot 16-1 from its first end 16-1a to its second end 16-1b is thirty-six (36) inches.

The second slot 16-2 is used to measure the length of threshold markings 104 and the spacing or separations between them 104a. It also measures the six (6) inch black borders. The length of second slot 16-2 from its first end 16-2a to its second end 16-2b is sixty-nine (69) inches.

The third slot 16-3 is used to measure the width of the touchdown markings, triples 108a, doubles 108b, and singles 108c. It also measures the six (6) inch black borders. The length of third slot 16-3 from its first end 16-3a to its second end 16-3b is six (6) feet or seventy-two (72) inches.

The fourth slot 16-4 is used to measure the widths on the designation markings 106 and the gaps between touchdown zone markings 108a. It also measures the six (6) inch black borders. The length of fourth slot 16-4 from its first end 16-4a to its second end 16-4b is five (5) feet or sixty (60) inches.

Figure 2:
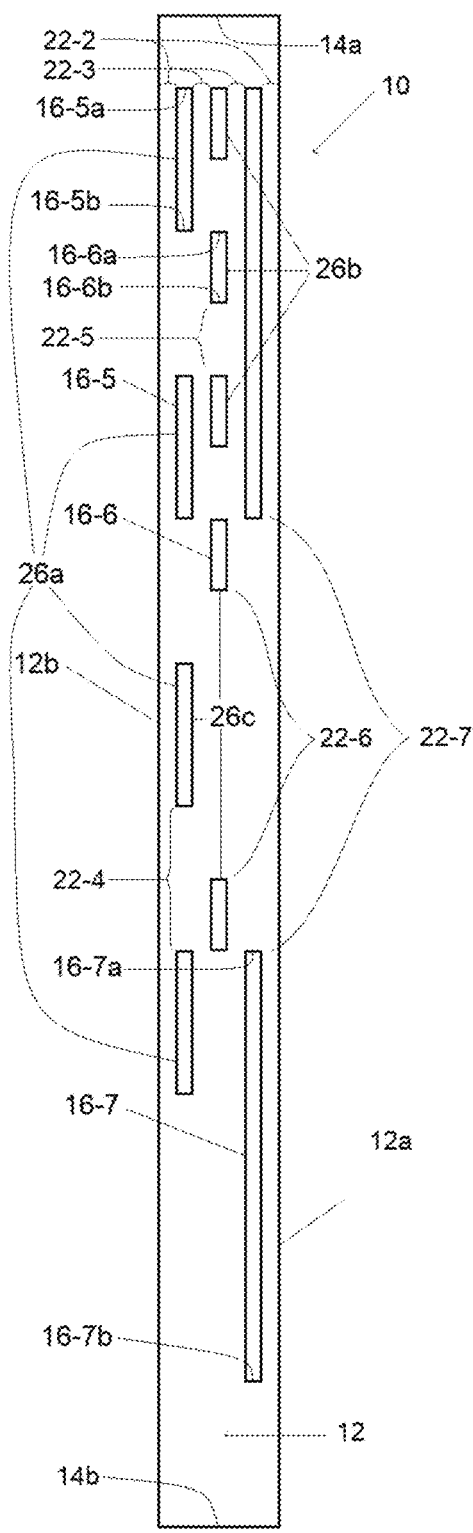
FIG. 2 is a top side view of a second embodiment of the airfield gauge.

FIG. 2. illustrates a second embodiment of a gauge 10. In this second embodiment, the slots 16-5, 16-6, and 16-7 are two (2) inches wide. Separations 22-2, or the distance from an edge 12a or 12b to the outside slots 16-7 or 16-5 respectively, are two (2) inches wide. Separations 22-3, or the distance between the edges of fifth slots 16-5 and seventh slots 16-7 to the edges of the sixth slots 16-6 are one (1) inch.

Fifth slots 16-5 are used by laying the gauge 10 perpendicular on the hold bar with the left edge at the edge on the enhancement and measure the six (6) inch and twelve (12) inch spacing while simultaneously checking the distance and width on the centerline 126 from the hold bar 100. The four (4) fifth slots 16-5 form first orientation 26*a* which can be used to layout a new hold bar. First orientation 26*a* can also be used to measure the nine (9) inch skips on the enhancement. The length of a fifth slot 16-5 from its first end 16-5*a* to its second end 16-5*b* is twelve (12) inches. And the separations 22-4, or the distance between each of the fifth slots 16-5, is twelve (12) inches.

Sixth slots 16-6 can be used to measure the widths and borders on a six (6) inch enhancement. The length of sixth slot 16-6 from its first end 16-6*a* to its second end 16-6*b* is six (6) inches. The separations 22-5, or the distance between the four (4) sixth slots 16-6 that make up second orientation 26*b* is six (6) inches, while the separation 22-6, or the distance between the two (2) sixth slots 16-6 that make up third orientation 26*c* is twenty-four (24) inches. Three (3) of the sixth slots 16-6 can be used to form a second orientation 26*b*. The second orientation 26*b* can be used to measure the widths and borders on a 6" enhancement. Set the first side fifth slot 16-5*a* of second orientation 26*b* on the left edge of the taxiway centerline 126. Once the gauge 10 is placed properly, the taxiway centerline 126 will cover the entire space of the fifth slot 16-5 of second orientation 26*b*. From that point the user can use the two sixth slots 16-6 of second orientation 26*b* to measure width of skips on either side of the centerline. The width of each skip will cover the entire space in the two sixth slots 16-6 of second orientation 26*b*.

On a hold bar 100 the two dashed (or skip lines) that face the runway are 3 feet long with 3 foot spaces between the skips. The length of seventh slot 16-7 from its first end 16-7*a* to its second end 16-7*b* is thirty-six (36) inches, and seventh slots 16-7 are used for measuring three (3) foot skips and gaps on hold bar while measuring twelve (12) inch width simultaneously with the border of the gauge 10. The separation 22-7 between the seventh slots 16-7 is thirty-six (36) inches.

Together, the two (2) seventh slots 16-7 form a fourth orientation 26*d* which can be used together with the separation between the seventh slots 16-7 to measure the nine (9) inch skips on the enhancement. A single seventh slot 16-7 can be used to measure the 3 foot space on the enhancement between skips. Use both seventh slots 16-7 to measure the nine (9) inch length of skips on the enhanced taxiway centerline 100. Place the left edge of seventh slot 16-7 on the edge of the skip on the centerline with the balance of the gauge 100 extending across the length of the skip. Use the right edge of the second seventh slot 16-7 on the opposite end of the skip to measure it's length. The nine (9) foot skip will cover the entire space of the first seventh slot 16-7, the second seventh slot 16-7 and the separation 22-7 in between them.

Two (2) of the sixth slots 16-6 that are on either side of one (1) of the fifth slots 16-5 as shown, can be used to form a third orientation 26*c*. The distance between the two (2) seventh slots 16-7 is six (6) inches, while the distance between the two (2) sixth slots 16-6 that make up third orientation 26*c* is thirty-six (36) inches. Third orientation 26*c* is used to measure the widths and borders on a twelve (12) inch enhancement.

Figure 3:
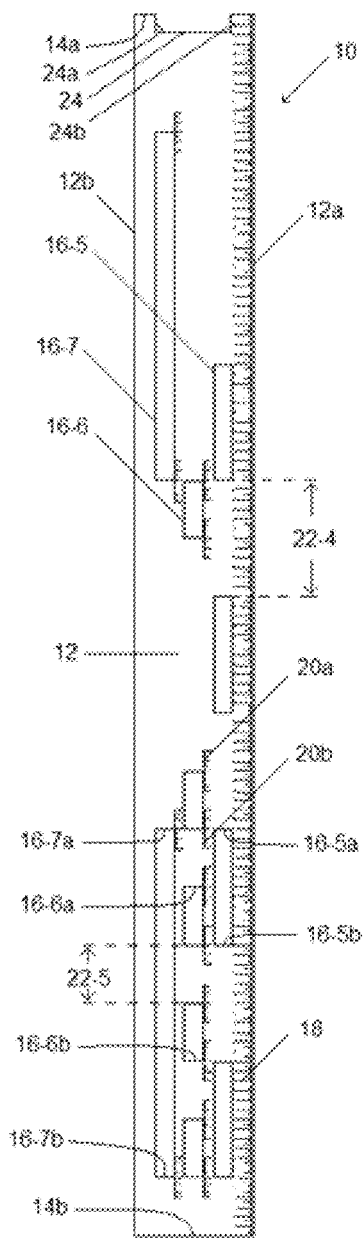
FIG. 3 is a top side view of the airfield gauge with hatching or gradations.

FIG. 3. illustrates variations and additions that may be incorporated into the various embodiments of the gauge 10. A scale 18 may be incorporated into the gauge first edge 12*a* or gauge second edge 12*b*. A slot graduation 20 may be incorporated at the first 20*a* or second ends 20*b* of the slots 16. The slot graduation 20 may be used to verify either the extent to which an airport marking is off, or if there is a border as described in regard to slots 16-1, 16-2, 16-3, and 16-4. Additional slots may also be incorporated gauge end 12*a* or 12*b*, or gauge edge 14*a* or 14*b* as shown in this figure as edge slot 24 which has a first end 24*a* and a second end 24*b*.

Another anticipated variation of the gauge 10 is the inclusion of reference colors. Specific FAA colors may be affixed to the gauge 10 so a color comparison can be made between the markings and the reference color. One or more reference colors can be affixed to the top of the gauge. Specifically the anticipated reference colors are found in the Federal Standard 595 which has about 900 approved colors, although paint colors: White color number 37925, Red color number 31136, Yellow color number 33538 or 33655, Black color number 37038, Pink color combination of numbers 1 part 31136 to 2 parts 37925, and Green color number 34108 are anticipated.

Similarly, specific reflectivity standards may be affixed to the gauge 10 so a reflectivity comparison can be made.

Figure 4A:
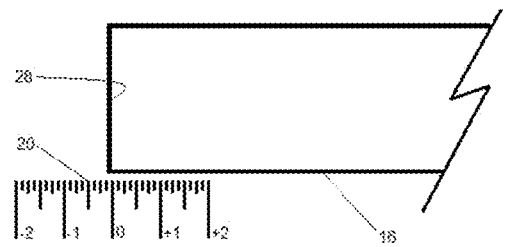
FIG. 4a is a partial top side view of the airfield gauge with a first embodiment of hatching or gradations.
Figure 4B:
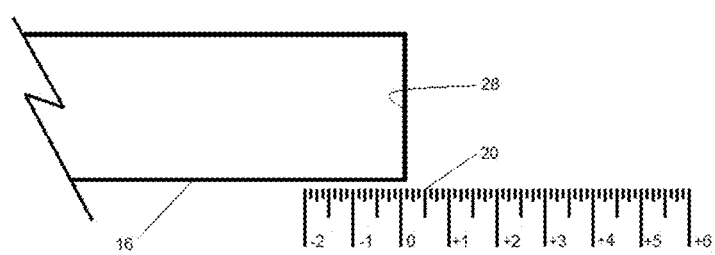
FIG. 4b is a partial top side view of the airfield gauge with a second embodiment of hatching or gradations.

FIGS. 4*a*. and 4*b*. are expanded views of a slot 16 end with an associated slot graduation 20. It is anticipated that the slot graduations 20 may be of varying length, and can extend both in a negative direction and a positive direction from the slot 16 end.

Figure 5A:
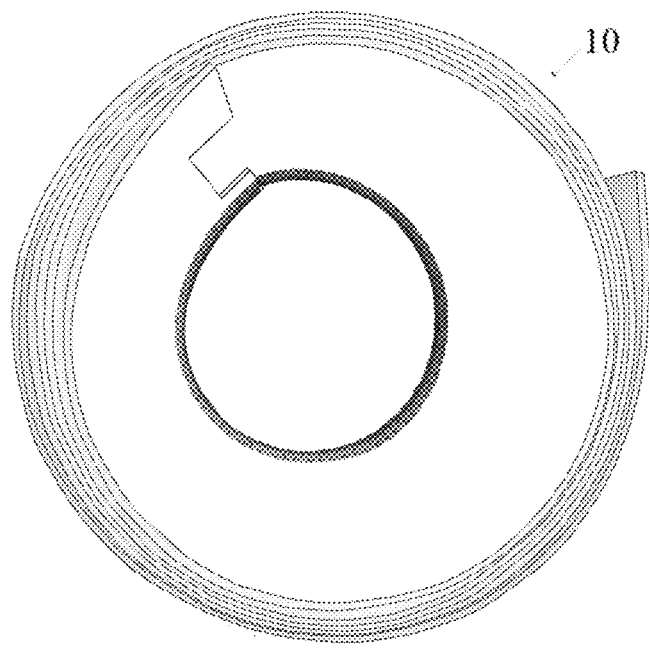
FIG. 5a is an edge, perspective view of a rolled, flexible airfield gauge.
Figure 5B:
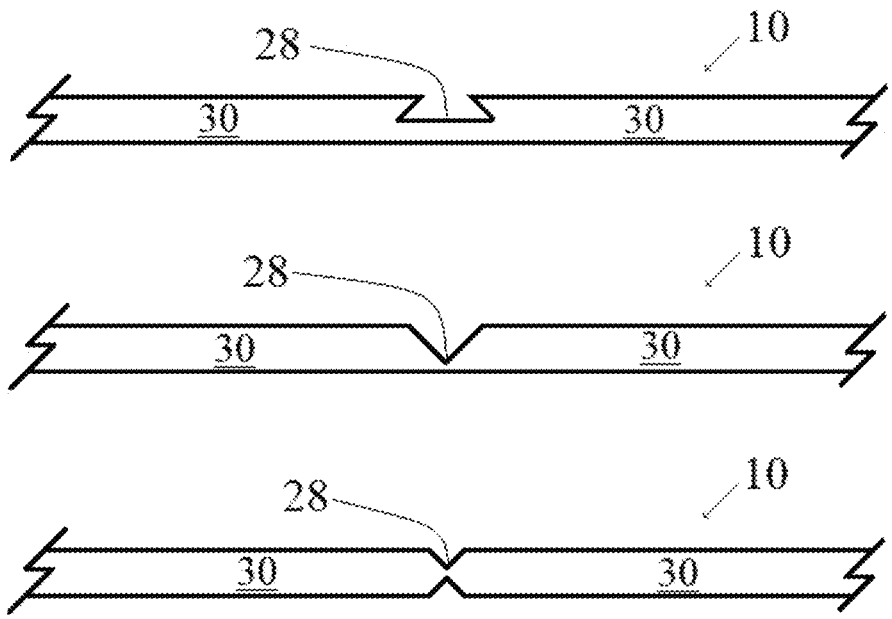
FIG. 5b is an edge view showing various pivot shapes in a foldable airfield gauge.

FIGS. 5*a*, 5*b*, 5*c*, and 5*d*. illustrate some storage packing options for the gauge 10. As shown in FIG. 5*a*, it is anticipated that the gauge 10 material may be flexible such that it can conform to rises and falls in the airfield runways and taxiways. Likewise, if the gauge 10 material is flexible, it can be rolled for storage or transport. This figure shows the gauge 10 rolled for storage or transport. FIG. 5*b* illustrates that, in an alternative embodiment, folding and storage of the gauge 10 may be accomplished through the use of pivots 28 integrated with the gauge 10.

Figure 5C:
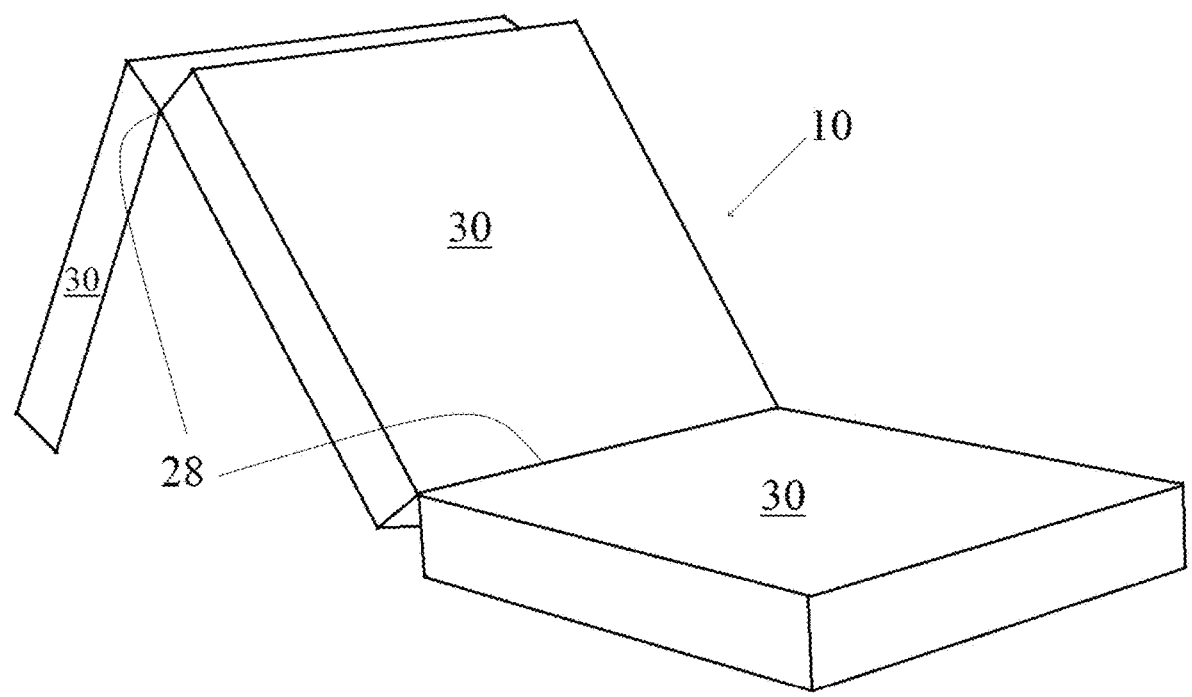
FIG. 5c is an edge, perspective view of a first embodiment of a partially folded, foldable airfield gauge.
Figure 5D:
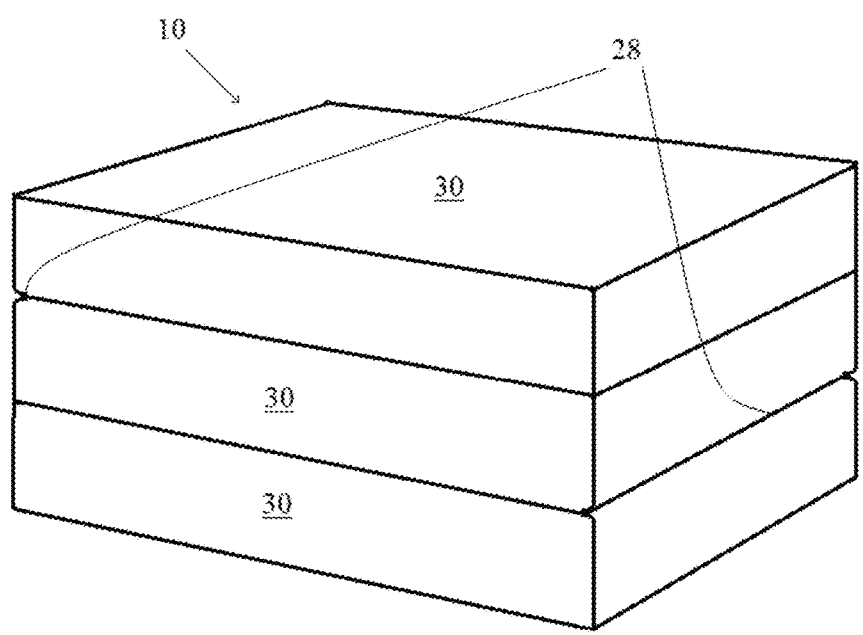
FIG. 5d is an edge, perspective view of a first embodiment of a folded, foldable airfield gauge.

There are many embodiments that the pivots 28 may take. As shown in FIG. 5*b*, it is anticipated that the pivots 28 could be a succession of narrowed portions running in a line the width of gauge 10. There could be many different shapes of the narrowed portion of the pivots 28. Likewise other embodiments that allow for folding of the gauge 10 such as engines, creases, or insert of relatively more flexible material could be used. FIG. 5*c* illustrates the gauge 10 folded in an accordion or map-like manner.

FIG. 6*a-i*. illustrate the method of using one embodiment of the gauge 10. In this example (and not intended to illustrate analyzing all of the markings at the airfield), the holding position marking, or hold bar, 100 is analyzed using the gauge 10 for compliance. The gauge 10 is laid flat over the holding position marking 100 with the gauge side 12 facing up.

Figure 6A:
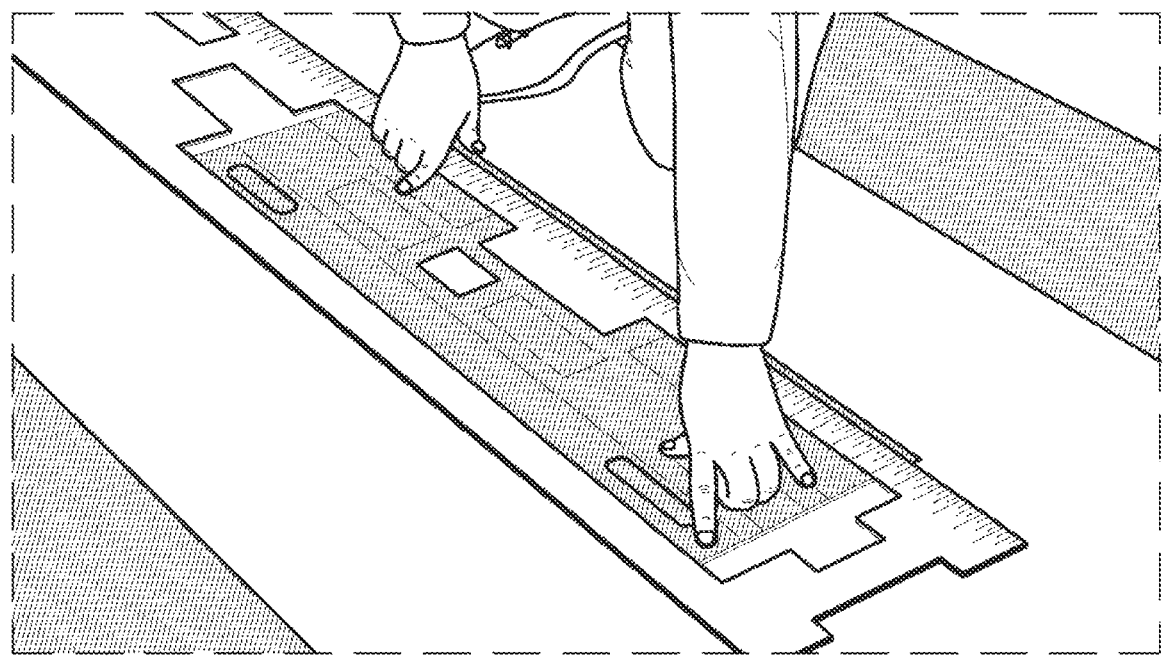
FIG. 6a-i illustrate a method of using the airfield gauge.

FIG. 6*a*. illustrates using use slots 16-5 for measuring three (3) foot skips and gaps on the hold bar 100.

Figure 6B:
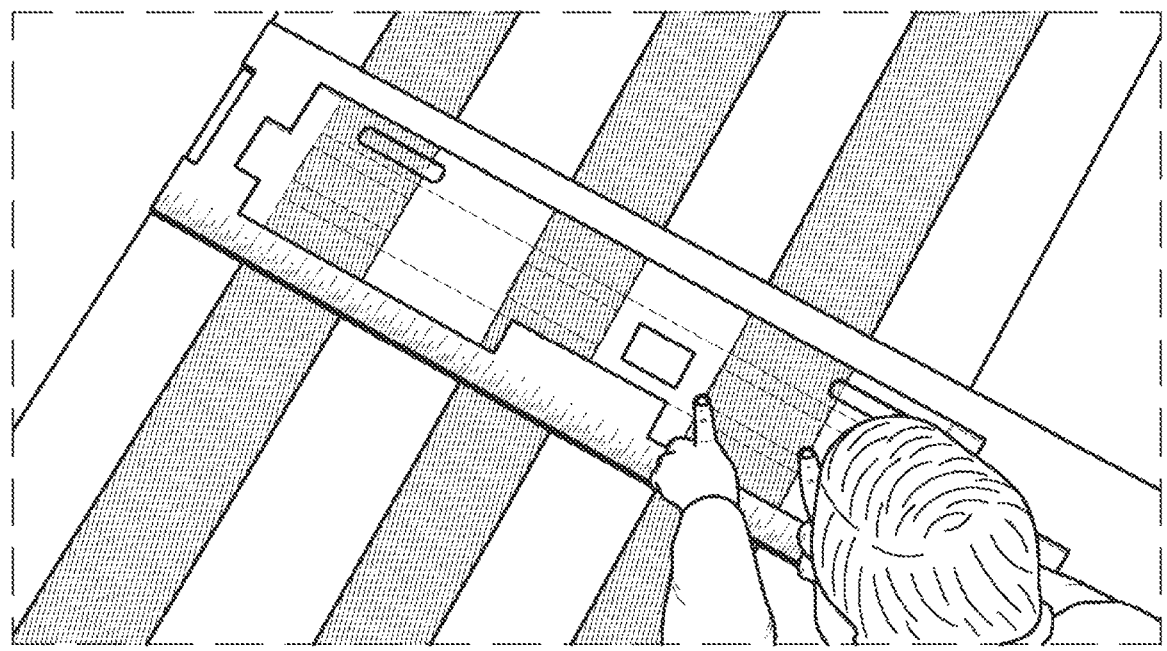
Figure 6C:
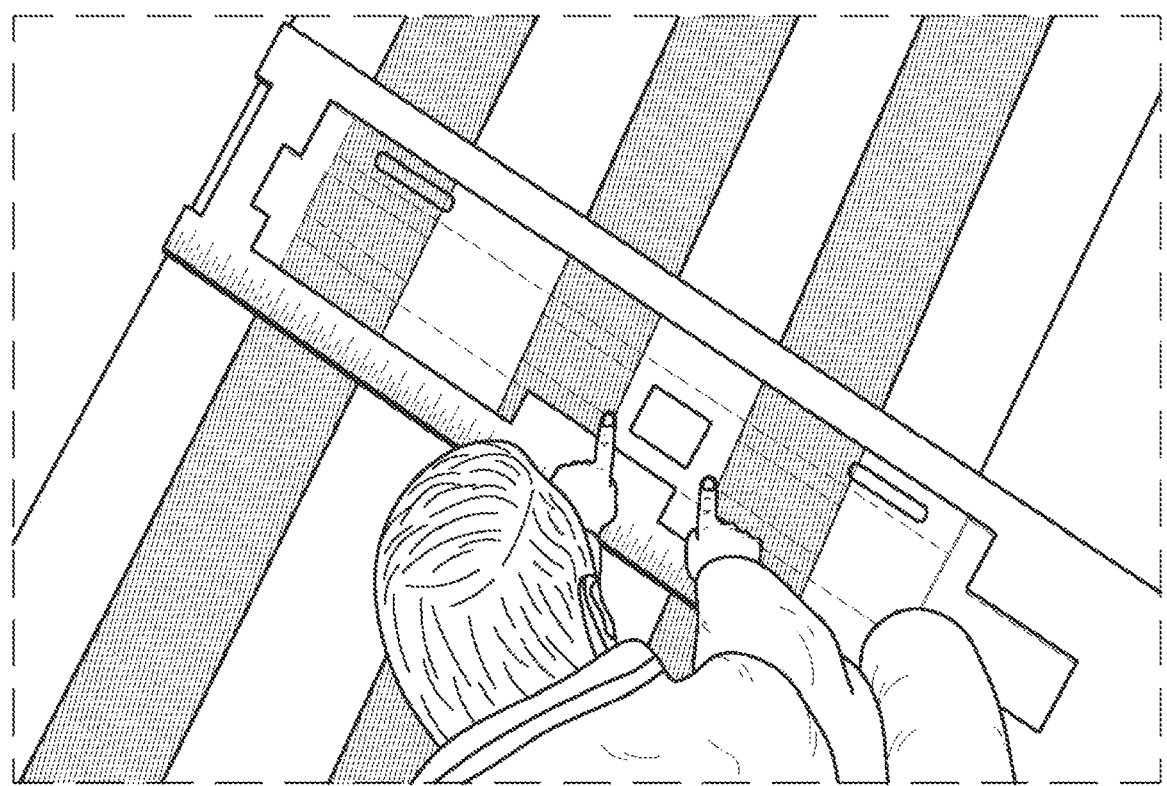

FIGS. 6*b*. and 6*c*. illustrate using slots 16-6 to measure the widths and black borders on a six (6) inch enhanced taxiway centerline 120.

Figure 6D:
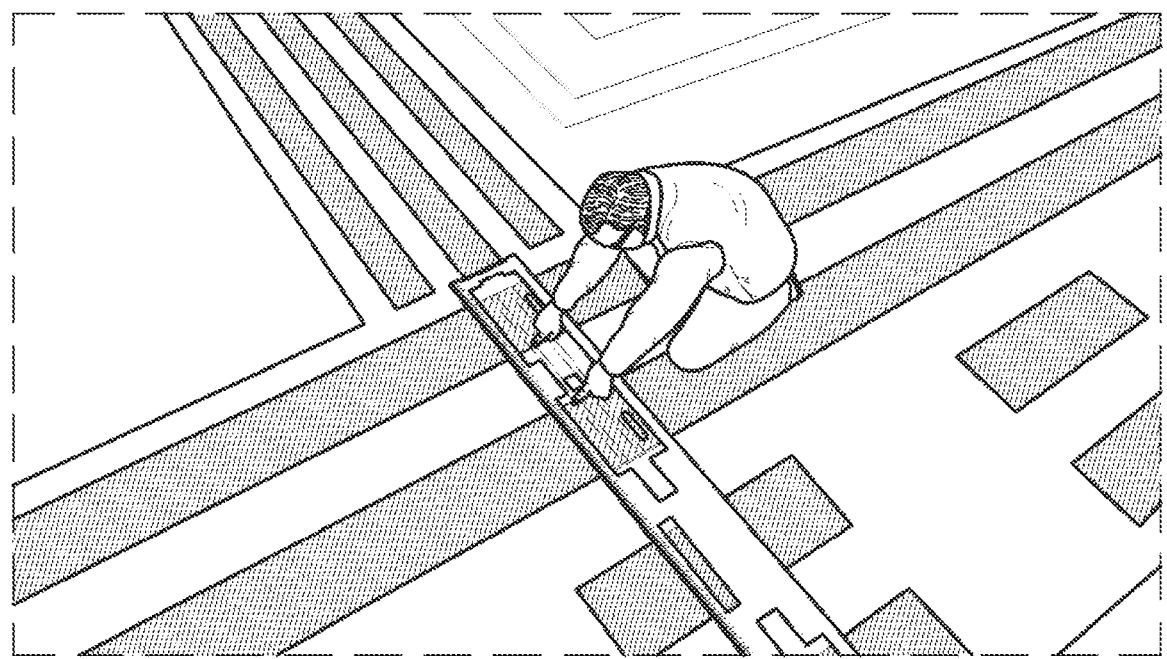
Figure 6E:
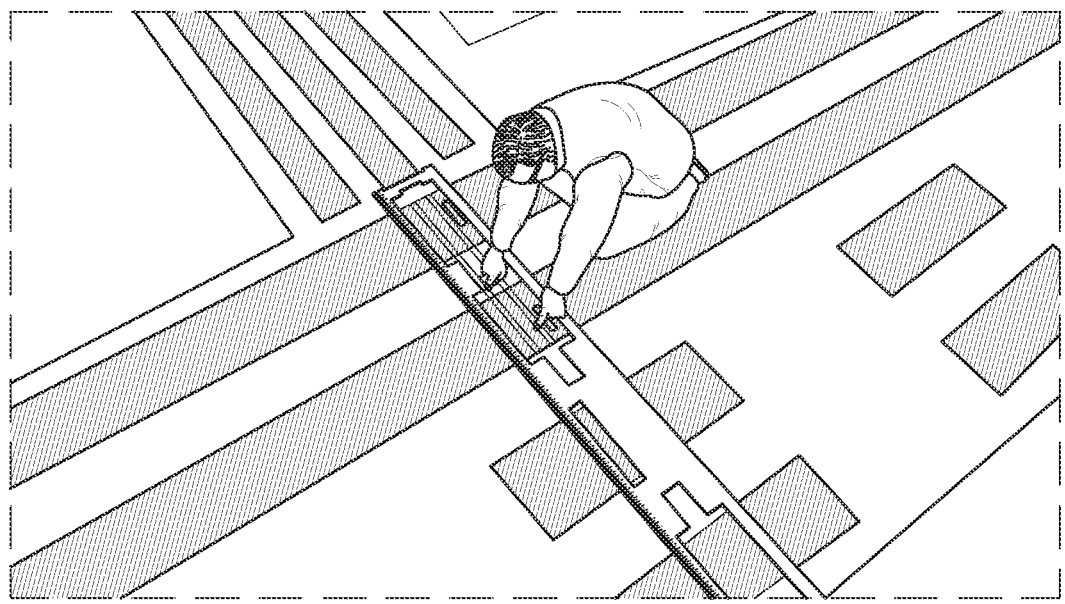
Figure 6F:
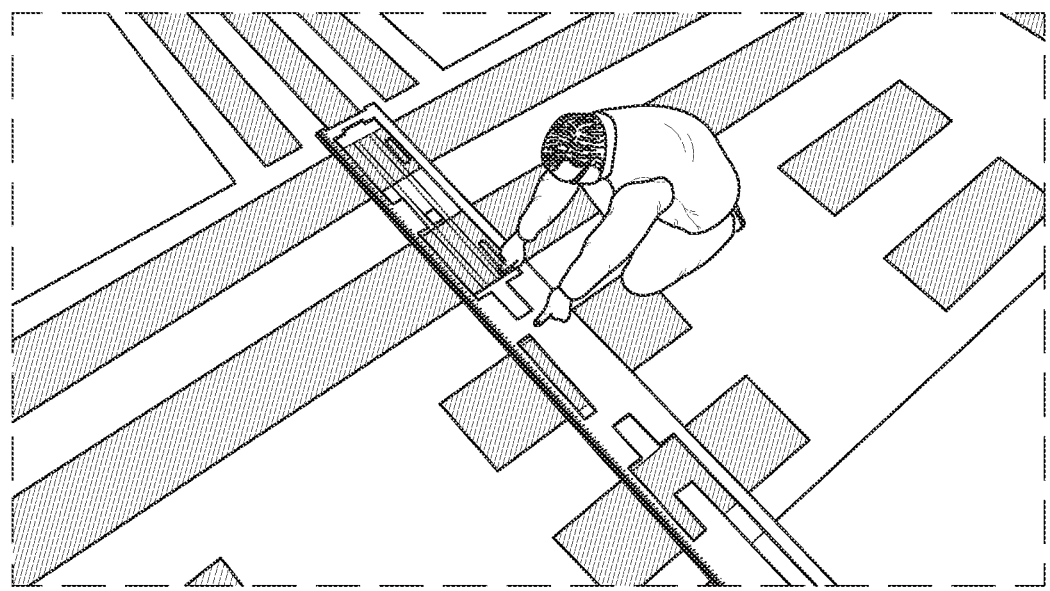
Figure 6G:
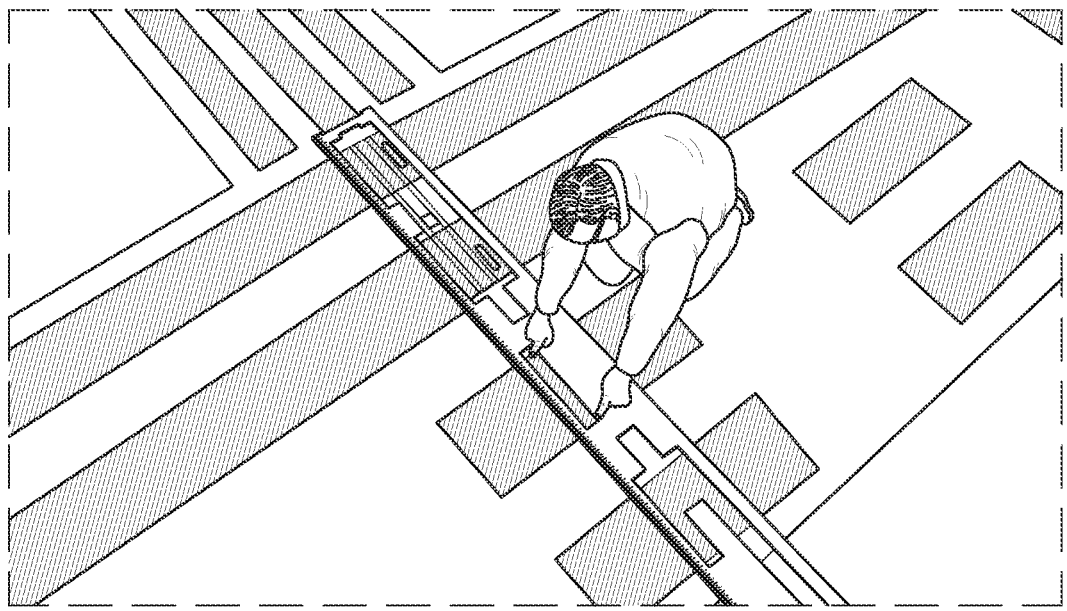
Figure 6H:
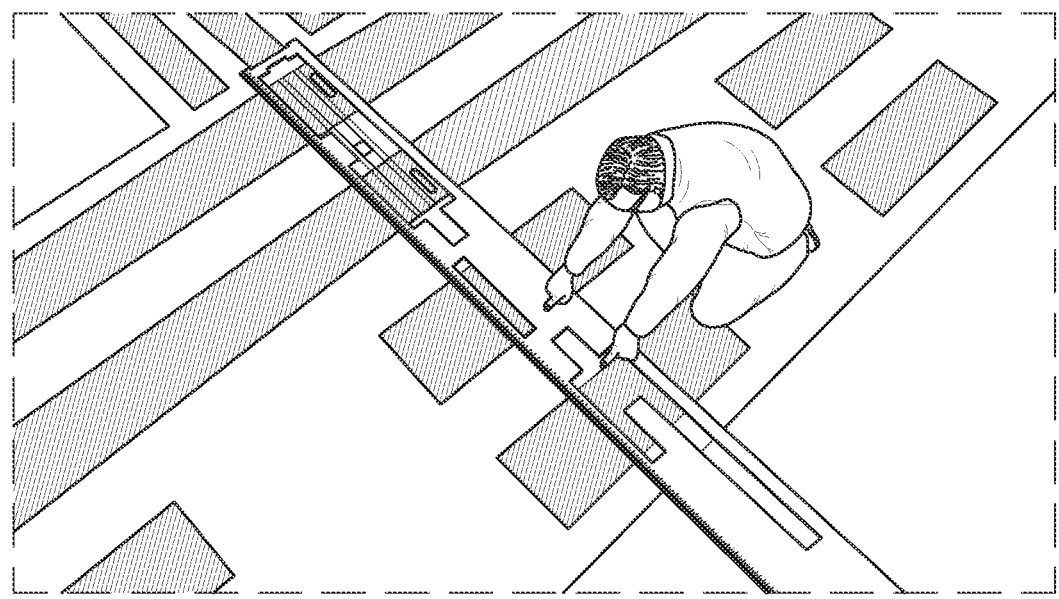
Figure 6I:
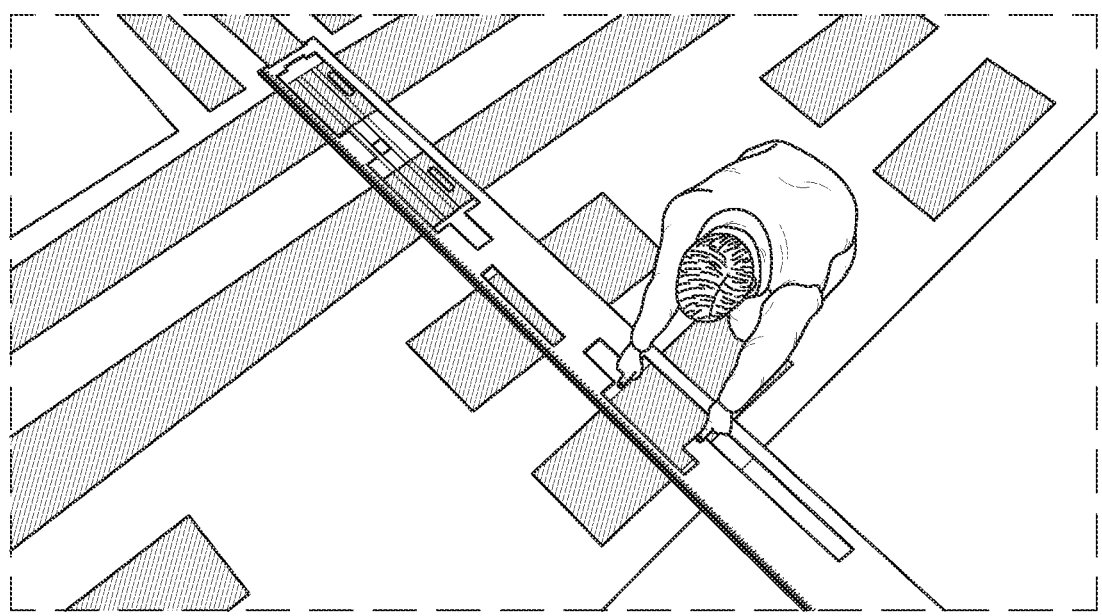

FIGS. 6*d.-6i*. illustrate making numerous marking measurements all at once with the gauge 10. The gauge 10 is laid perpendicular to the taxiway side of the hold bar 100 with gauge second edge 14*b* on the edge of the enhancement 120 closest to the hold bar 100. The user can measure the hold bar's 100 six (6) inch and one (1) foot spacing with slots 16-5 while checking the distance with using slots 16-5 to measure to the taxiway centerline.

Other markings are measured in the same manner simply by choosing the correctly sized slots 16 on the gauge 10.

An airfield marking as little as a half inch out of compliance can be a problem for the airfield. Inaccurate marking can be very expensive to fix, as well as causing additional problems due to closures, safety concerns and other related problems. The method for verifying that an airfield's runway and taxiway markings are a specific size, uses a single gauge to make multiple measurements with specific, predetermined slot sizes.

The method of use of the gauge involves laying the gauge flat on the runway or taxiway over a subject marking. Use the appropriate slot (as used hereinafter, "slot" is intended to mean collectively a slot or slots or area between slots or gauge edge) depending upon the required size of the subject marking, by positioning the gauge over the subject marking the appropriate slot over the marking. Because the slots are either apertures through the gauge or made of transparent or semi-transparent material, the marking can be observed through the gauge with the gauge in place. The size of the marking is compared to the size of the slot (slots or area between slots) which are sized almost exactly to the required specification. Both colored markings' widths and lengths, and the 6 inch black borders can be analyzed for compliance with the standards by simply comparing them to the slot. For some markings, multiple markings can be analyzed at the same time.

For example (and not intended to illustrate analyzing all of the markings at the airfield), once the gauge is laid on the runway or taxiway over the marking the analysis may begin. Step one use two (2) of the multiplicity of fifth slots 16-5 for measuring three (3) foot skips and gaps on the hold bar 100. Step two use three (3) of the multiplicity of sixth slots 16-6 to measure the widths and black borders on an enhanced taxiway centerline (or 6 inch enhancement) 120. The next step allows you to make numerous measurements all at once. Step three, lay the gauge 10 perpendicular on the hold bar 100 with the gauge end 14 on the edge of the enhancement 120 and measure the 6 inch and 1 foot spacing with the fifth slots 16-5 and separations 22-4 between the fifth slots 16-5 while checking the distance with using the other gauge end 14 for the taxiway centerline.

Figure 7:
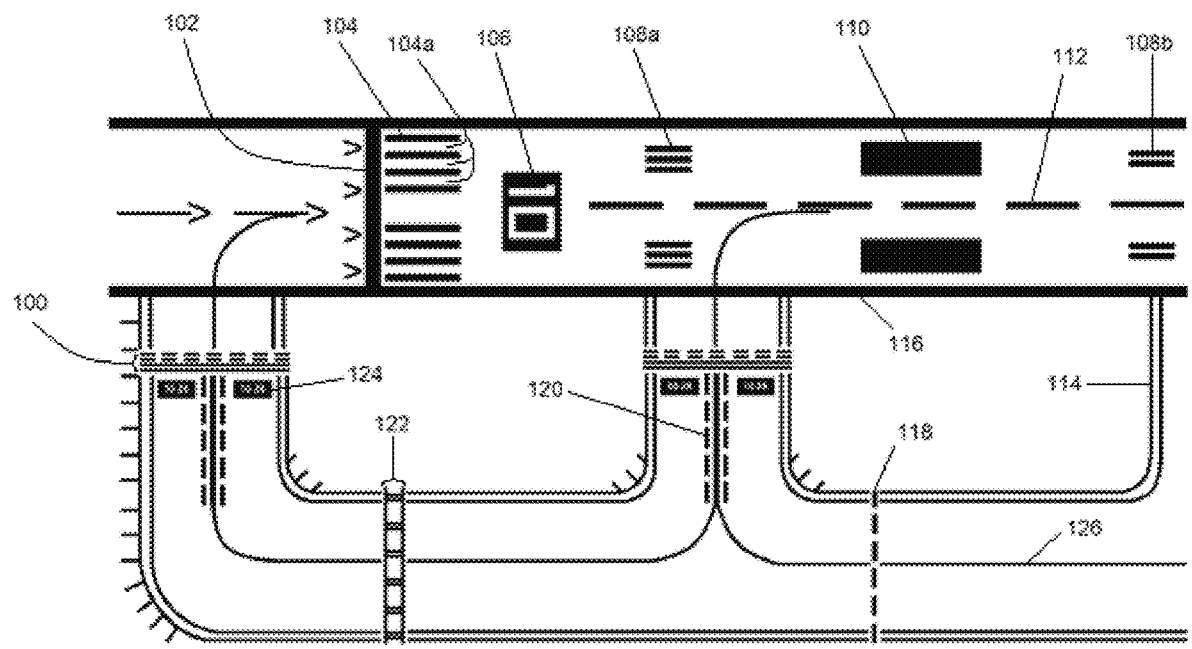
FIG. 7 is a top view illustrating various markings used at an airfield.

FIG. 7. illustrates various features of airfield taxiway and runway markings that can be measured by the gauge 10. The holding position marking, or sometimes known as the hold bar, 100 marks the place that aircraft are held on the taxiway prior to entering the runway. The holding position marking 100 consists of four lines that are each 12 inches wide, two of which consist of 3 foot long dashes and spaces (often called the skip lines), and two more which consist of solid lines. The taxiway centerline 126 ends 6 to 12 inches prior to contacting the first of the holding position marking 100 lines. Side to side, the runway hold position lines 100 extend from a first side taxiway edge line 114 to the opposite side taxiway edge line 114. The runway centerline 112 begins three (3) feet beyond the fourth line (or second dashed line) of the hold bar 100. The landing designator marking 106 provides the designation number of the specific runway. The threshold bar 102 is a marking that extends from a first side runway edge line 116 to the opposite side runway edge line 116. Threshold markings 104 extend perpendicularly from (but with a break) the threshold bar 102, and are separated from each other by threshold marking separations 104*a*.

Fixed distance singles 108*c* and fixed distance doubles 108*b*, indicate relative positions along the runway in 500 foot increments. While the touchdown zone triples 108*a* indicate the area along the length of the runway that it is intended for planes to land. Airplane pilots can look for the runway aiming point 110 as they guide their planes down.

The taxiway has separate markings including the intermediate holding position marking 118, the enhanced taxiway centerline 120, and the enhanced taxiway centerline 120, the ILS/MLS holding position marking critical boundary 122, and the surface painted holding position sign 124.

Statements concerning the described apparatus and method are sometimes made in the present tense. Use of the present tense is for simplicity, however, as some of the apparatus, methods, steps and results are anticipated apparatus, methods, steps and results rather than statements of past tests and use.

It should be noted that when "about" or "approximately" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities and the like used in the present specification and associated claims are to be understood as being modified in all instances by the terms "about" or "approximately." As used herein, the terms "about" or "approximately" encompasses +/−5% of each numerical value. For example, if the numerical value is "about 80%," then it can be 80%+/−5%, equivalent to 75% to 85%. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

The terms "about" or "approximately" are defined as being close to as understood by one of ordinary skill in the art, and in one non-limiting embodiment the terms are defined to be within 10%, preferably within 5%, more preferably within 1%, and most preferably within 0.5%. Accordingly, unless indicated to the contrary, the numerical parameters set forth in this specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The terms "inhibiting" or "reducing" or any variation of these terms refer to any measurable decrease, or complete inhibition, of a desired result. The terms "promote" or "increase" or any variation of these terms includes any measurable increase, or completion, of a desired result.

The term "effective," as that term is used in the specification and/or claims, means adequate to accomplish a desired, expected, or intended result.

The terms "a" or "an" when used in conjunction with the term "comprising" in the claims and/or the specification may mean "one," but it is also consistent with the meaning of "one or more," "at least one," and "one or more than one."

The term "each" refers to each member of a set, or each member of a subset of a set.

The terms "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

In interpreting the claims appended hereto, it is not intended that any of the appended claims or claim elements invoke 35 U.S.C. 112(f) unless the words "means for" or "step for" are explicitly used in the particular claim.

It should be understood that, although exemplary embodiments are illustrated in the figures and description, the principles of the present disclosure may be implemented using any number of techniques, whether currently known or not. The present disclosure should in no way be limited to the exemplary implementations and techniques illustrated in the drawings and description herein. Thus, although the invention has been described with reference to specific embodiments, this description is not meant to be construed in a limited sense. Various embodiments may include some, none, or all of the enumerated advantages. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention. Modifications, additions, or omissions may be made to the systems, apparatuses, and methods described herein without departing from the scope of the disclosure. For example, the operations of the systems and apparatuses disclosed herein may be performed by more, fewer, or other components in the methods described may include more, fewer, or other steps. Additionally, steps may be performed in any suitable order.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. An apparatus for verifying that an airfield's runway and taxiway markings are a specific size, comprising:
   a gauge bounded by a first edge, a second edge, a first end and a second end;
   said gauge having a top side and a bottom side;
   a first slot;
   wherein said first slot is one of: six (6) inches, twelve (12) inches, thirty-six (36) inches, sixty (60) inches, sixty-nine (69) inches, or seventy-two (72) inches long;
   a first slot graduation at a first end of said gauge;
   a second slot graduation at a second end of said gauge;
   wherein said gauge is flexible;
   wherein said gauge is transparent or semi-transparent;
   wherein the boundary of said first slot is determined by at least one of printed, raised, or grooved lines on the boundary, or an aperture through said gauge wherein the edges of said aperture define the boundary;
   wherein a portion of said gauge is made with a magnifying material; and
   wherein said magnifying material covers said slot.

2. The apparatus of claim 1, wherein said magnifying material covers said first slot graduation and said second slot graduation.

3. The apparatus of claim 1, wherein said gauge can be rolled.

4. The apparatus of claim 1, wherein said gauge can be folded.

5. The apparatus of claim 1, wherein a portion of said top side has a reference color affixed.

6. The apparatus of claim 1, further comprising a multiplicity of first slots, wherein said first slots are two (2) inches wide and said multiplicity of first slots are three (3) inches apart.

7. The apparatus of claim 1, further comprising:
   a multiplicity of said first slots, wherein said first slots are twelve (12) inches long and two (2) inches wide, and wherein each of said multiplicity of first slots have a separation of twelve (12) inches from each adjacent said first slot;
   a multiplicity of a second slot, wherein said second slots are six (6) inches long and two (2) inches wide, and wherein each of said multiplicity of second slots have a separation of six (6) inches or twenty-four (24) inches from each adjacent said second slot;
   a multiplicity of a third slot, wherein said third slots are thirty-six (36) inches long and two (2) inches wide, and wherein each of said multiplicity of third slots have a separation of thirty-six (36) inches from each adjacent said third slot.

8. The apparatus of claim 7, wherein said gauge can be rolled.

9. The apparatus of claim 7, wherein said gauge can be folded.

10. The apparatus of claim 7, wherein a portion of said top side has a reference color affixed.

11. The apparatus of claim 7, further comprising an edge slot incorporated into said first end or said second end.

12. The method for verifying that an airfield's runway and taxiway markings are a specific size, using a single gauge, comprising the steps of:
   laying said gauge on the runway or taxiway over the marking to be analyzed, and wherein said gauge is comprised of:
   a gauge bounded by a first edge, a second edge, a first end and a second end;
   said gauge having a top side and a bottom side;
   a first slot;
   wherein said first slot is one of: six (6) inches, twelve (12) inches, thirty-six (36) inches, sixty (60) inches, sixty-nine (69) inches, or seventy-two (72) inches long;
   a first slot graduation at a first end of said gauge;
   a second slot graduation at a second end of said gauge;
   wherein said gauge is flexible;
   wherein said gauge is transparent or semi-transparent;
   wherein the runway and taxiway markings are a hold bar, the hold bar's skips and gaps, a black border of the enhanced taxiway centerline, an enhanced taxiway centerline, a 6 inch and 1 foot spacing of the hold bar, further comprising the steps of:

lay two (2) of the multiplicity of fifth slots of said gauge on the skips and gaps on the hold bar;

measure the skips and gaps;

lay three (3) of the multiplicity of sixth slots on the widths and black borders of the enhanced taxiway centerline;

measure the widths and black borders;

lay the gauge perpendicular on the hold bar with a gauge end on the edge of the enhancement and with the fifth slots and separations between said fifth slots on the 6 inch and 1 foot spacing;

measure the 6 inch and 1 foot spacing; and using the opposing gauge end, measure the distance to the taxiway centerline.

\* \* \* \* \*